Feb. 26, 1935.  A. C. BISHOFF  1,992,808
TRAILER STRUCTURE
Filed May 3, 1934
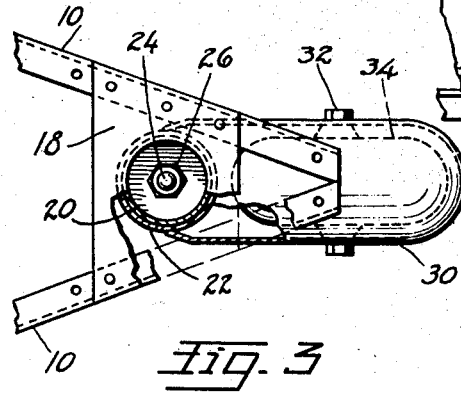
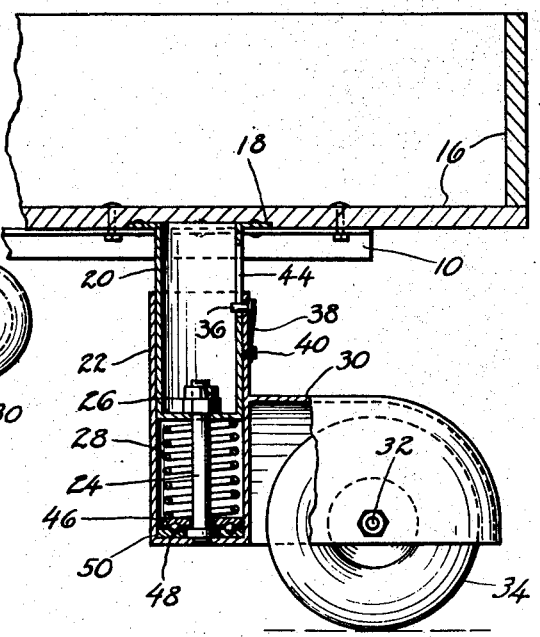
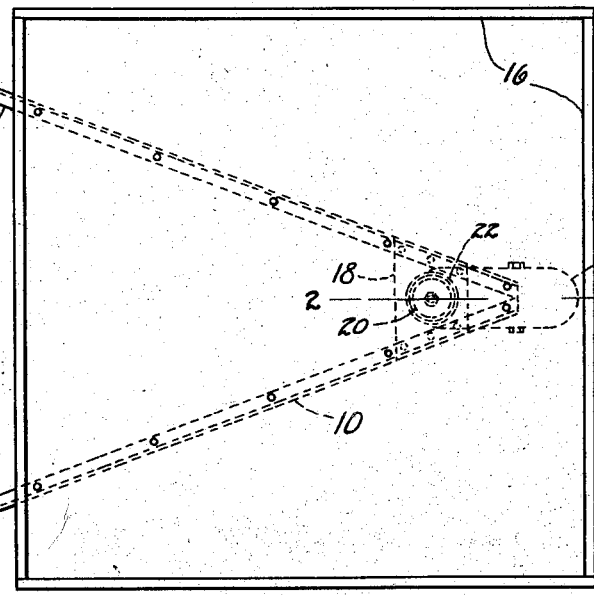
INVENTOR.
August Charles Bishoff
BY
Parker & Burton
ATTORNEYS.

Patented Feb. 26, 1935

1,992,808

UNITED STATES PATENT OFFICE 1,992,808

TRAILER STRUCTURE

August Charles Bishoff, Detroit, Mich.

Application May 3, 1934, Serial No. 723,727

3 Claims. (Cl. 280—33.2)

My invention relates to improvements in trailers and particularly to a small light trailer structure which is adapted to be connected to the rear of a motor vehicle of the pleasure type.

An object is to provide a trailer of this character which is simple, inexpensive, and of light weight.

A further object is to provide a trailer which is adapted to be connected to the towing vehicle at two points and is supported upon a single road wheel. The road wheel support is of such a character that the wheel will swivel readily after the manner of a caster so that the trailer may be easily moved in any direction. The improvement consists particularly in the novel mechanism whereby a single road wheel is associated with a trailer to serve its purpose as a supporting wheel and to swivel readily to a trailing position upon movement of the vehicle.

A meritorious feature is that the construction is entirely enclosed and housed in presenting a neat appearance and comprises a minimum number of movable parts and is exceedingly simple in construction.

My improved structure is characterized in that, while the wheel is normally free to swivel, control means is provided to lock the same against swivelling when it is desired.

Various other advantages, meritorious features and characteristics will more fully appear from the following description, appended claims, and accompanying drawing, wherein:

Figure 1 is a plan which illustrates a trailer embodying my invention,

Fig. 2 is a vertical sectional view through the construction shown in Fig. 1,

Fig. 3 is a plan of the structure shown in Fig. 2 with a portion of the trailer floor broken away, and Fig. 4 is a side elevation of a fragment of the structure shown in Fig. 2.

My improved trailer is of the type adapted to carry a small load. It is intended to be very light and easily transported and capable of attachment to the rear of a pleasure vehicle. It is shown here in its simplest form, namely, a trailer having an open box body. In the drawing the trailer is shown as having a frame 10 which is of a generally triangular shape. At the forward end the frame is adapted to be attached to the rear end of a motor vehicle. In Fig. 1 broken away portions 12 indicate the frame ends of a motor vehicle and the frame 10 of the trailer is shown as attached thereto by connecting means 14. The trailer is provided with a body or box portion 16 which may take any form but is here shown merely as being of the open body type.

At the rear end of the frame where the side rails come together there is provided a plate 18 to which a road wheel assembly is secured. This road wheel assembly is of the single wheel type. This single wheel is supported after the manner of a caster wheel. As illustrated this wheel depends below the trailer somewhat forwardly of the rear end and slightly rearwardly of the middle. It would be located at the point desired to properly distribute the load.

In the construction shown there is provided a tubular element 20 which is secured to the plate 18 by rivets or the like. This element is in the form of a tubular plunger. Received over the lower end of the element for reciprocal relative movement is a cylinder 22. Means are provided to connect the cylinder and plunger together to limit while permitting their relative telescoping movement. This means is shown in the form of a connecting pin 24 which is secured as illustrated in Fig. 2 to the bottom of the cylinder and extends through an aperture provided in the bottom of plunger 20. This pin 24 carries nuts 26 on the end within the plunger so that the cylinder and plunger are held together while having a relative motion as permitted by the length of the pin or bolt and as hereinafter described.

Coil spring 28 is disposed within the cylinder underneath the plunger to take the load of the plunger. This spring encircles the bolt 24. It serves as the suspension spring.

The cylinder 22 carries the road wheel through a wheel support or wheel housing 30 which extends laterally or rearwardly from the cylinder as shown. This wheel is supported in the form of a closed housing as appears in Figs. 1 and 2 and is provided with an axle 32 upon which a road wheel 34 is mounted. This road wheel is so offset from the vertical axis of rotation of the plunger and cylinder that it functions as a caster wheel. It will be understood that normally the cylinder and plunger are associated not only for vertical reciprocal movement but the cylinder will rotate freely upon a vertical axis about the plunger. A ball bearing supported plate 46 is disposed below the suspension spring 28 to facilitate relative rotation of the cylinder and piston. The ball bearings are indicated as 48 and there is a complementary bearing plate 50 in the bottom of the cylinder.

In Fig. 4 I have shown means whereby the cylinder and plunger may be locked together against rotation. This means is in the form of a pin 36 carried by a resilient spring arm 38 which arm is secured at 40 to the cylinder. This pin is adapted to extend through an opening 42 in the cylinder and seat within the slot 44 in the plunger so that while the cylinder and plunger are locked against relative rotation about a vertical axis they are permitted to reciprocate vertically due to shock of travel of the vehicle over the road.

What I claim:

1. A trailer having a frame adapted to be attached to a vehicle and provided with a tubular plunger depending from the frame, a cylinder telescoping over the lower end of the plunger and provided with a wheel support extending radially therefrom, a road wheel carried by the support, a connecting pin securing said piston and cylinder together while permitting limited telescoping movement thereof, and a coil spring arranged within the cylinder underneath the plunger taking the load of the trailer.

2. A trailer having means whereby it may be attached to a vehicle and provided with a downwardly projecting tubular plunger, a cylinder telescopically mounted over the lower end of the plunger and provided with a radially projecting wheel housing, a road wheel journalled within the housing, a connecting pin carried by the cylinder and extending slidably through the bottom of the plunger connecting the plunger and cylinder together while permitting relative telescoping movement thereof, a coil spring arranged within the cylinder underneath the plunger to take the load of the trailer, said plunger and cylinder being relatively rotatable, and means adapted to releasably couple said cylinder and plunger together to prevent relative rotation while permitting relative telescoping movement.

3. A trailer having means whereby it may be attached to a vehicle and provided with a downwardly projecting tubular plunger, a cylinder telescopically mounted over the end of the plunger and provided with a radially projecting wheel support, a road wheel journalled upon the support, a connecting pin carried by the cylinder and extending slidably through the bottom of the plunger connecting the plunger and cylinder together while permitting relative telescoping movement thereof, a coil suspension spring arranged within the cylinder underneath the plunger taking the load of the plunger, a ball bearing support disposed in the bottom of the cylinder underneath the suspension spring, said plunger and cylinder being relatively rotatable, and means adapted to releasably couple said cylinder and plunger together to prevent relative rotation while permitting relative telescoping movement.

AUGUST CHARLES BISHOFF.